Aug. 16, 1932. C. N. BERGMANN 1,872,103
PLUNGER VALVE FOR RECEPTACLE FILLING APPARATUS
Filed Nov. 21, 1931.
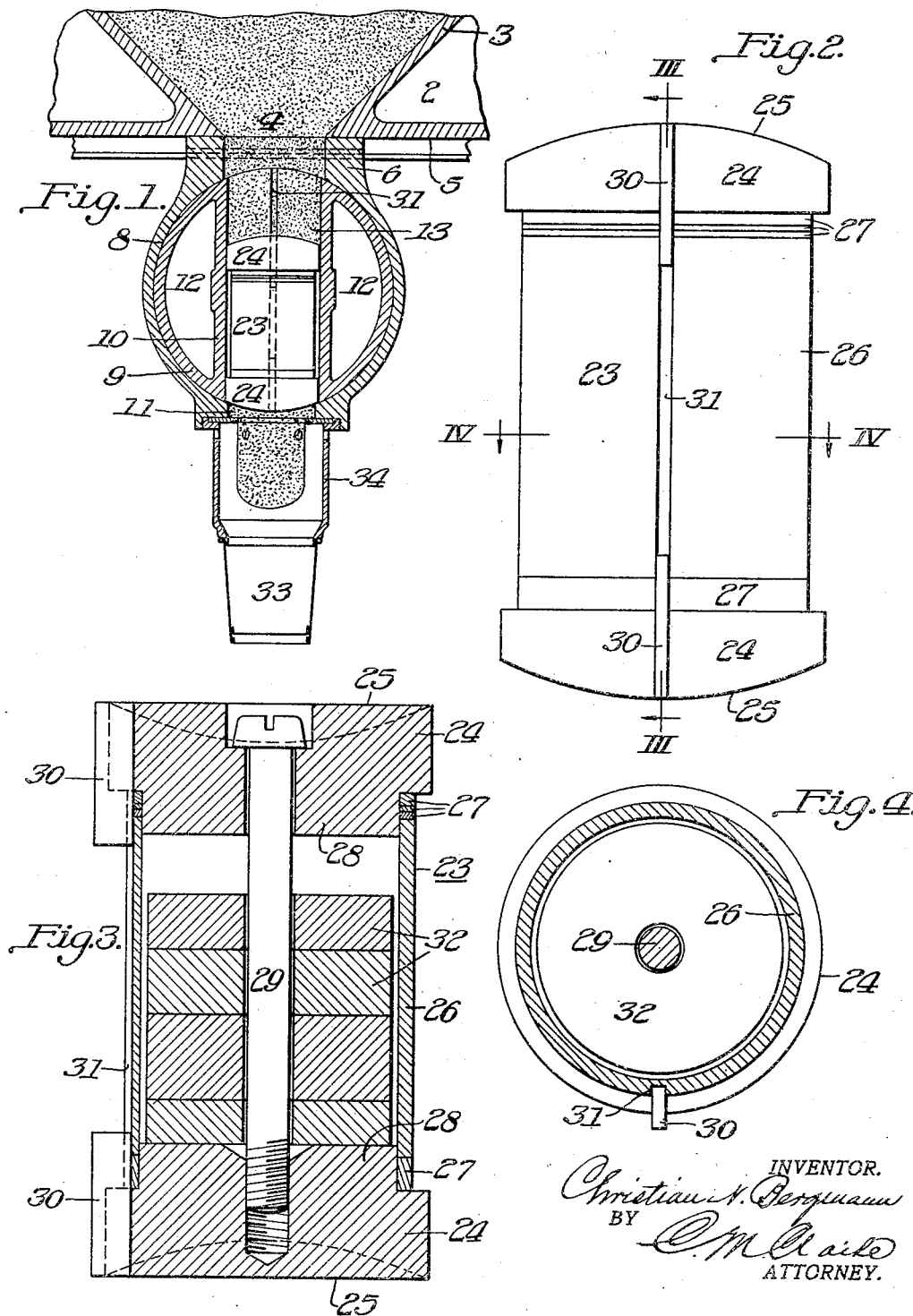
INVENTOR.
Christian N. Bergmann
BY
ATTORNEY.

Patented Aug. 16, 1932

1,872,103

UNITED STATES PATENT OFFICE

CHRISTIAN N. BERGMANN, OF PITTSBURGH, PENNSYLVANIA, ASSIGNOR TO BERGMANN PACKAGING MACHINE COMPANY, OF PITTSBURGH, PENNSYLVANIA, A CORPORATION OF DELAWARE

PLUNGER VALVE FOR RECEPTACLE FILLING APPARATUS

Application filed November 21, 1931. Serial No. 576,482.

This invention is an improvement in plunger mechanism for receptacle filling apparatus of the type disclosed in my prior application No. 315,511. In such construction a measured amount of material, as ice cream, cottage cheese, etc., is withdrawn from a superimposed mass by means of a rotatable drum provided with a transverse opening adapted to register with opposite receiving and delivery openings of the casing for discharge into a suitable receptacle, as a cup. The rotatable drum or barrel is provided with an alternately movable gravitating plunger capable of limited movement across the transverse opening of the drum, effecting discharge of a previously severed unit with simultaneous inflow at its opposite end, as the drum is rotated one half revolution.

The drawing illustrates the invention, in which:

Fig. 1 is a vertical section through the operative portion of the machine, showing the plunger lowered in ejecting position with inflow of material above the plunger;

Fig. 2 is a view of the plunger in side elevation, enlarged;

Fig. 3 is a vertical sectional view on the line III—III of Fig. 2;

Fig. 4 is a cross section on the line IV—IV of Fig. 2.

In the drawing, 2 represents the base of a hopper or reservoir 3 adapted to contain plastic or semi-frozen ice cream or other substance in a sufficiently soft condition to pass downwardly through a central delivery opening 4 by the suction induced by the gravitating plunger.

The bottom of the hopper 2 is preferably planed off smooth underneath providing a flat attaching surface 5, upwardly against which is secured the closely fitting flat upper surface of the unit measuring drum shell 6. The drum shell is fixedly mounted in registering position with the opening 4 by any suitable securing means, as bolts or screws.

The drum shell or casing 6 is generally cylindrical in form and is bored out to provide an inner cylindrical face 8 within which is rotatably mounted the drum 9. The drum as shown is provided with a middle transverse cylindrical plunger shell or casing 10 opening midway continuously through the drum and adapted to register by its transverse cylindrical opening at one end and the other with the supply opening 4 from the hopper and with an opposite discharge opening 11 of casing 6 respectively. The drum is placed in either of two operative positions by a half rotation through suitable operating means, such as disclosed in my prior application.

The shell 10 surrounding the middle plunger cavity 13 is preferably integral with drum 9 and may be spaced inwardly from its outer cylindrical portion by intervening clearance spaces 12 at both sides and around the shell at the ends, for lightness, and air or liquid circulation, if desired for temperature regulation. One or both sides of casing 6 are closed by a suitable cover plate, drum 9 being held against lateral movement, thus insuring accurate registration with the supply and discharge openings 4 and 11.

Slidably mounted within the transverse cylindrical cavity 13 of shell 10 is the gravity plunger measuring valve 23 which is the active gravitating element of the unit measuring mechanism.

Plunger measuring valve 23 is preferably of considerable weight for positive operation in effecting withdrawal and ejection of measured amounts of the contents of the reservoir. In the present construction it is designed to utilize weights, as impelling elements, adapted to overcome any partial resistance or sticking when used with any products such as comparatively dry cottage cheese, or other similar substance or material.

For such purpose the plunger is provided with terminal heads 24—24, rounded as at 25 with the same radius as that of the inner annular face 8 of the shell. When the plunger measuring valve is lowered by gravity as in Fig. 1, the lowermost part-cylindrical end 25 will therefore neatly fit against the interior cylindrical face of casing 6 during rotation without interference or undue friction, and will seal the outlet opening when in discharge position.

It will be observed that the outlet opening 11 is of slightly less diameter than that of plunger opening 13, providing ample overlap bearing for the lower end of the plunger.

The middle portion of the plunger measuring valve is preferably slightly less in diameter than its heads and provides an annular space which will ordinarily become filled with ice cream or other material tending to form an air-tight packing ring or seal with resulting suction action.

A further advantage is that the filling of such space provides continuous desirable lubrication for the plunger valve during operation of the machine, when used with a substance, as ice cream, containing lubricating elements.

In the construction shown, the middle portion of the valve is composed of a cylindrical shell 26 which may be either single or composed of a plurality of parts, as by supplemental ring extensions 27, providing for desirable lengthening or shortening of the total length of the plunger. I am also able by such adjustment to provide for variation in the measured amount entering cavity 13 from the hopper above the plunger, in lowering.

The shell 26, either with or without such rings, has shouldered engagement with heads 24, over their inward extensions 28, the heads and shell being fixedly held together by a central connecting bolt 29. The latter, as shown, is provided with a head seated in a recess in one of the heads 24 and is tapped into the opposite head, tightly securing the parts in position.

Heads 24 are provided with fixedly mounted longitudinal keys 30 slidably engaging keyway 31 of the shell 26 and maintaining the plunger measuring valve in proper nonrotatable longitudinally-slidable position, as to its part-cylindrical terminals 25 at all times within the casing 10 of rotating drum 9 and with relation to the inner surface of the enclosing casing 6. Keys 30 are fixedly secured in the heads as shown, and extend part way into a receiving keyway 31 of shell 26, insuring sufficient length and bearing of the guiding keys, and fixedly holding the several parts in alinement with each other.

For the purpose of varying the weight of the plunger measuring valve, more or less, I utilize a series of variable weights 32, each having a central opening for passage of bolt 29. The weights 32 are freely mounted around the bolt and within the casing 26 so that for each half rotation of the drum, with corresponding alternate gravitating movement of the plunger, the weights will also have an independent relative movement in the plunger interior.

Such movement may be varied depending on the lost motion space provided, so that at each operation the plunger receives a momentum impact by the several weights, against its lower head. This arrangement is of considerable advantage in insuring positive action of the plunger tending to overcome any hesitation or sticking interference, and ensuring a positive downward stroke for each movement.

The hollow plunger shell may, however, be entirely filled with weights or only partially so, dependent on the kind and character of material being used with the measuring machine.

The construction and operation of the improved plunger mechanism will be readily understood from the foregoing description. When the drum 9 is in the position in Fig. 1 and the plunger is lowered by gravity with the outer rim portion of lower head 24 bearing against the surrounding edges of the reduced opening 11, the upper cavity 13 above the plunger valve becomes filled with a measured amount of the contents of the hopper by gravity assisted by the suction action of the lowering plunger.

At the same time a previously formed unit will have been ejected downwardly through the shell into a receptacle 33 which is held upwardly by one hand of the operator against the lower tapering rim edge of a supplemental guiding shell 34 of standard construction. Upon removal of such filled receptacle and an empty one being replaced in the same manner, the drum 9 is rotated one half revolution carrying around with it the introduced charge above the plunger, furnished from the main hopper or reservoir.

Such portion is severed from the superimposed mass upon rotation of the drum, by its edge portion surrounding the cavity 13, and the plunger valve being carried around by the drum will gradually increase its gravitating force as the drum passes the half way position, due to its weight.

When the severed unit comes into register with the lower opening 9 the plunger valve will descend from the opposite side of the drum, ejecting the unit through opening 11 and at the same time drawing downwardly an equivalent gravitating portion from the hopper delivery opening ready for rotation, severance, and ejection in the same manner upon the next half rotation of the drum.

The drum is preferably rotated alternately in one direction and the other, the speed of operation being only limited by the skill and speed of the operator.

It will be understood of course that the construction of the plunger may be varied as to size, dimensions, weight, etc. to adapt it to different machines and conditions as to material being operated upon, and that such changes are within the skill of the builder or designer.

What I claim is:

1. A cylindrical plunger for receptacle filling machines of the class described having terminal heads and a middle hollow body portion provided with loosely mounted weights.

2. A cylindrical plunger for receptacle filling machines of the class described having terminal heads and a middle hollow body portion provided with a series of loosely mounted weights.

3. A cylindrical plunger for receptacle filling machines of the class described having terminal heads, a middle shell, a central bolt connecting the heads, and a series of weights surrounding the bolt.

4. In a plunger of the class described, a pair of terminal heads having guiding keys, a separating shell, a bolt connecting the heads, and a series of weights surrounding the bolt.

5. In a plunger of the class described, a pair of terminal heads having curved cylinder engaging ends and laterally extending guiding keys, a separating shell between the heads, a bolt connecting the heads in tight engagement with the shell, and a series of weights surrounding the bolt.

6. In a plunger of the class described, a pair of terminal heads having guiding keys, a separating plural section shell having shouldered engagement with the heads, a central bolt connecting the heads, and a series of weights surrounding the bolt.

7. A cylindrical plunger for receptacle filling machines of the class described having terminal heads and a middle hollow body portion provided with a series of weights partially filling the longitudinal space of the hollow body capable of imparting an impact against one of the heads when the plunger is reversed.

8. In a plunger of the class described, a pair of terminal heads having a separating shell of less diameter than that of the heads providing an annular filling space, a bolt connecting the heads, and a series of weights surrounding the bolt and longitudinally movable thereon.

9. In a plunger of the class described, a pair of terminal heads having a plural section separating shell of less diameter than the heads in shouldered engagement therewith, a bolt connecting the heads, and a series of weights surrounding the bolt and longitudinally movable thereon within the shell adapted to impart momentum movement to the plunger upon gravitating movement of the weights.

10. In a plunger of the class described, a pair of terminal heads having a separating shell of less diameter than that of the heads providing an annular filling space, keys engaging the shell and each head in alinement with each other, a bolt connecting the heads, and plural weights in the shell.

In testimony whereof I hereunto affix my signature.

CHRISTIAN N. BERGMANN.